(12) United States Patent
Laghate et al.

(10) Patent No.: US 11,190,252 B2
(45) Date of Patent: Nov. 30, 2021

(54) ANTENNA ELEMENT SELECTION SYSTEM

(71) Applicant: QUALCOMM Incorporated, San Diego, CA (US)

(72) Inventors: Mihir Vijay Laghate, San Diego, CA (US); Ruhua He, San Diego, CA (US); Qunfeng He, Escondido, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/913,202

(22) Filed: Jun. 26, 2020

(65) Prior Publication Data

US 2020/0412425 A1    Dec. 31, 2020

Related U.S. Application Data

(60) Provisional application No. 62/868,463, filed on Jun. 28, 2019.

(51) Int. Cl.
*H04B 7/06* (2006.01)
*H04B 7/08* (2006.01)
(Continued)

(52) U.S. Cl.
CPC ......... *H04B 7/0617* (2013.01); *H04B 7/0626* (2013.01); *H04B 7/0632* (2013.01);
(Continued)

(58) Field of Classification Search
CPC ........ H04B 7/028; H04B 7/04; H04B 7/0404; H04B 7/0408; H04B 7/0413;
(Continued)

(56) References Cited

U.S. PATENT DOCUMENTS

| | | | |
|---|---|---|---|
| 2005/0239510 A1* | 10/2005 | Cho | H04W 36/06 455/562.1 |
| 2009/0010354 A1* | 1/2009 | Sudo | H04L 1/0026 375/267 |

(Continued)

FOREIGN PATENT DOCUMENTS

| | | |
|---|---|---|
| WO | 2017196249 A1 | 11/2017 |
| WO | 2019041977 A1 | 3/2019 |

OTHER PUBLICATIONS

International Search Report and Written Opinion—PCT/US2020/040017—ISA/EPO—dated Sep. 9, 2020.

*Primary Examiner* — Siu M Lee
(74) *Attorney, Agent, or Firm* — Qualcomm Incorporated

(57) ABSTRACT

This disclosure generally relates to systems, devices, apparatuses, products, and methods for wireless communication. For example, a user equipment (UE) device within a wireless communication system may select a desired number of antenna elements for receiving a communication from another device based on a channel quality determination. The UE receives a first signal from a transmitting device using a first beam. The UE determines a channel quality metric and compares the channel quality metric with a channel quality threshold. The UE adjusts a number of antenna elements used for beamformed wireless communication between the transmitting device and the UE based on the comparison between the channel quality metric and the channel quality threshold. Based on this adjustment, the UE receives a second signal from the transmitting device using a second beam that has a different number of antenna elements than the first beam.

31 Claims, 8 Drawing Sheets

(51) Int. Cl.
*H04L 27/26* (2006.01)
*H04W 72/04* (2009.01)
(52) U.S. Cl.
CPC ......... *H04B 7/088* (2013.01); *H04L 27/2613* (2013.01); *H04W 72/046* (2013.01)
(58) Field of Classification Search
CPC .... H04B 7/0426; H04B 7/046; H04B 7/0482; H04B 7/0617; H04B 7/0626; H04B 7/0632; H04B 7/08; H04B 7/0802; H04B 7/0805; H04B 7/0808; H04B 7/0817; H04B 7/082; H04B 7/0874; H04B 7/088; H04L 27/2613; H04W 72/046
See application file for complete search history.

(56) References Cited

U.S. PATENT DOCUMENTS

| | | | | |
|---|---|---|---|---|
| 2014/0342768 | A1* | 11/2014 | Soldati | H04W 52/241 455/522 |
| 2016/0140424 | A1* | 5/2016 | Wang | G06K 9/52 382/156 |
| 2016/0157133 | A1* | 6/2016 | Ehsan | H04B 7/0871 370/252 |
| 2018/0278467 | A1* | 9/2018 | John Wilson | H04W 72/046 |
| 2019/0223114 | A1* | 7/2019 | Kwok | H04W 52/30 |
| 2019/0260452 | A1* | 8/2019 | Zhang | H04B 7/0695 |

* cited by examiner

ANTENNA ELEMENT SELECTION SYSTEM

CLAIM OF PRIORITY

The present application for patent claims priority to U.S. Provisional Patent Application No. 62/868,463, entitled "Antenna Element Selection System," filed Jun. 28, 2019, which is expressly incorporated by reference herein.

TECHNICAL FIELD

This disclosure relates generally to wireless communications, and more specifically, to antenna element selection techniques.

DESCRIPTION OF RELATED TECHNOLOGY

Wireless communications systems are widely deployed to provide various types of communication content such as voice, video, packet data, messaging, broadcast, and other types of content. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes that may simultaneously support communication for multiple communication devices (e.g., user equipment (UE)).

Some wireless networks may utilize high frequencies and small wavelengths to provide high data rates. As one example, fifth generation (5G) capable millimeter wave (mmW) devices may communicate using frequencies at or near the extremely high frequency (EHF) spectrum with wavelengths at or near millimeter wavelengths. Although higher-frequency signals provide larger bandwidths to efficiently communicate large amounts of data, these signals may suffer from higher path loss (e.g., path attenuation). To compensate for the higher path loss, transmit power levels may be increased or beamforming may be used to concentrate energy in a particular direction.

In some cases, a wireless device (e.g., a UE) may be configured with multiple antenna elements, which may be organized into multiple antenna panels or arrays. A UE may use the multiple antenna elements for beamformed communication with another device. For example, the UE may use one or more of its antenna elements to receive beamformed signals transmitted from a base station to the UE. The UE may use its antenna elements to form one or more different receive beams that can receive downlink communications on a downlink channel from the base station. When multiple receive beams are available for use in a given downlink communication situation, an issue may arise regarding which receive beam the UE should select to receive the communication.

SUMMARY

The systems, methods and devices of this disclosure each have several innovative aspects, no single one of which is solely responsible for the desirable attributes disclosed herein. This disclosure generally relates to systems, devices, apparatuses, products, and methods for wireless communication. As one example, the disclosure more specifically relates to systems, devices, apparatuses, products, and methods regarding selection of a desired number of antenna elements at a user equipment (UE) device for receiving a communication from another device based on a channel quality determination. For example, the UE receives a first signal from a transmitting device using a first beam. The UE determines a channel quality metric and compares the channel quality metric with a channel quality threshold. The UE adjusts a number of antenna elements used for beamformed wireless communication between the transmitting device and the UE based on the comparison between the channel quality metric and the channel quality threshold. Based on this adjustment, the UE receives a second signal from the transmitting device using a second beam that has a different number of antenna elements than the first beam.

BRIEF DESCRIPTION OF THE DRAWINGS

The system may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
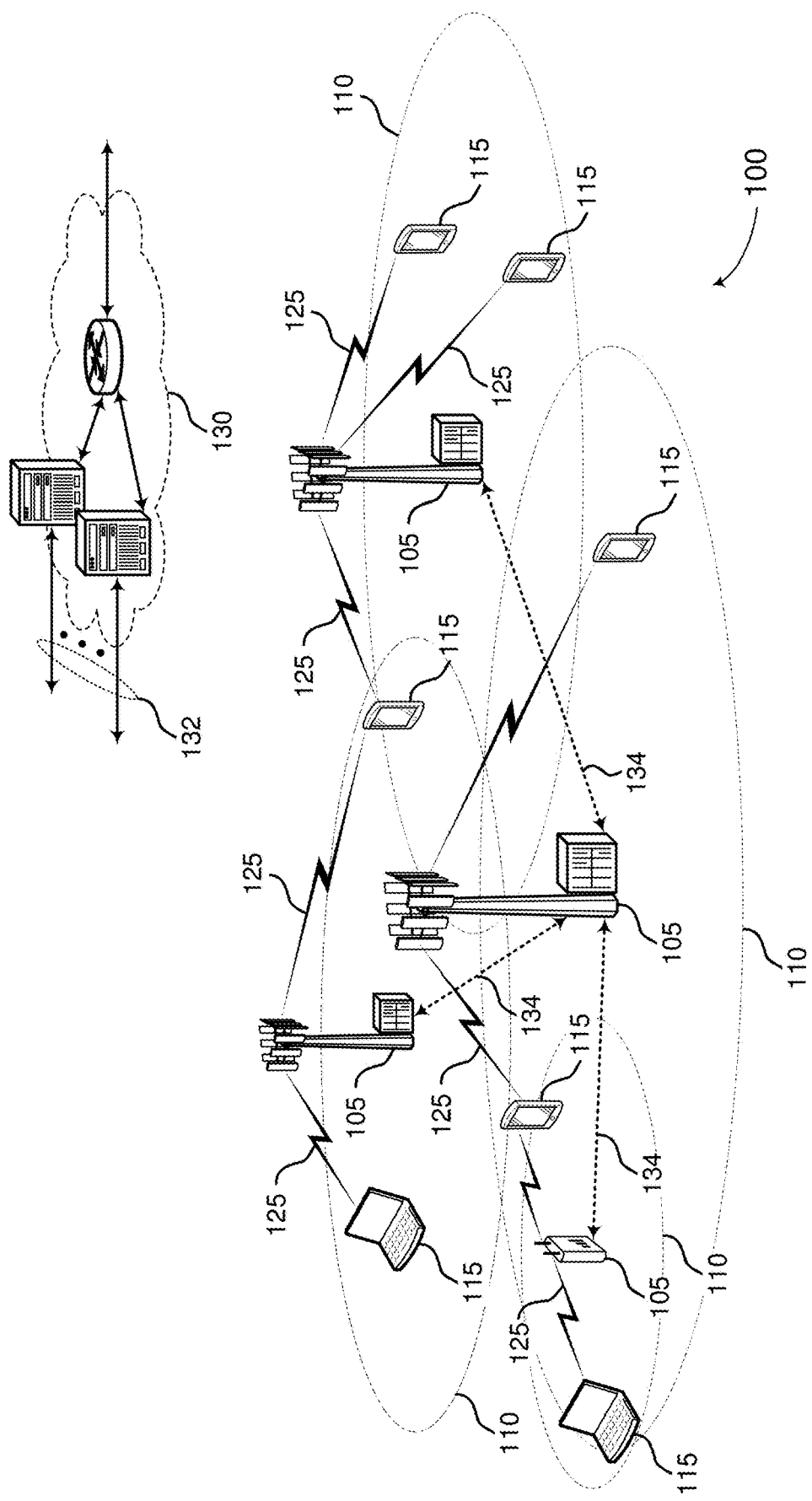
FIG. 1 illustrates an example of a wireless communications system that supports antenna element selection based on channel quality in accordance with aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The systems and techniques described in this detailed description provide various mechanisms for a user equipment (UE) to select a desired number of antenna elements for receiving a communication from another device. In one implementation, the UE may be communicating with a base station using beamforming techniques. In beamformed communications, the UE has the freedom to choose which beam it uses to receive incoming communications. For example, the UE may select a beam in order to optimize reception of the base station's signal on a downlink channel. The UE may select a receive beam from multiple available beams for a given communication situation. Typically, the UE will select the beam that maximizes the beamforming gain associated with using the selected beam. Selecting a beam that maximizes beamforming gain may serve to counter at least some of the propagation losses associated with the transmission while also suppressing more interference. In some situations, maximum beamforming gain may be achieved by selecting the beam that uses a maximum number of available antenna elements. The maximum number of available antenna elements may represent all of the antenna elements that are otherwise usable for the communication scenario at issue after considering other issues, such as directionality of the incoming communication and any other reasons for antenna element exclusion (e.g., thermal considerations, etc.). Selecting a receive beam that uses a relatively large number of antenna elements provides some advantages. For example, a beam with a relatively large number of antenna elements results in a narrower beam that may have higher interference suppression properties.

However, always selecting a receive beam based on achieving the maximum beamforming gain or based on using the maximum number of available antenna elements supported for a given communication may have some downside tradeoffs. As a first example, a UE's power consumption increases as a function of the number of receive antenna elements being used. For example, a beam using four receive antenna elements will use more power than a beam using two receive antenna elements. This extra power usage may result in a faster decline in the available battery life of a battery-powered UE. As a second example, the likelihood of saturating one or more components in the UE's receive radio frequency (RF) chain increases as the number of antenna elements being used rises. For example, certain RF chain components may saturate when the total input power exceeds a given threshold rating of the RF component. The total input power increases, potentially over the threshold rating of an RF component, when a higher number of antenna elements are used to receive an incoming signal.

The antenna selection techniques proposed in some implementations herein attempt to reduce the effects of the downside tradeoffs discussed above while still achieving at least some of the advantages of using a relatively high number of antennas when beneficial. For example, the proposed antenna selection techniques result from the recognition that although one available beam may achieve higher beamforming gain, higher interference cancellation, or higher general channel quality, that beam may provide a higher performance than is needed for a successful communication that could be achieved by a different beam using less antenna elements. In this situation, it may be preferable to sacrifice at least some beamforming gain or channel quality by using less antenna elements, which may achieve other benefits, such as power savings and/or the ability to lessen the chance of RF component saturation.

To balance the benefits of relatively high antenna element usage with the benefits of using less antenna elements, the antenna selection techniques discussed herein select the number of antenna elements based on a channel quality determination. When the quality of the channel is determined to be relatively favorable, a relatively high number of antenna elements may not be needed for successful communication, and a UE may choose to reduce the number of antenna elements used for an upcoming downlink reception. On the other hand, when the quality of the channel is determined to not be favorable (e.g., relatively higher interference is present), then a beam with a higher number of antenna elements may be beneficial, and thus the UE may increase the number of antenna elements used for an upcoming downlink reception. When the quality of the channel is determined to be relatively stable (e.g., as compared to a last measured channel quality determination), the UE may keep steady the number of antenna elements used for an upcoming downlink reception relative to a last reception opportunity. This balance of benefits allows a dynamic approach for beam selection providing increased beamforming gain when desired (e.g., when higher interference is present) and increased power savings (or other benefits) when desired (e.g., when the downlink channel quality is relatively high). More details regarding the disclosed antenna element selection features and benefits will be described in more detail below.

FIG. 1 illustrates an example of a wireless communications system 100 that supports a flexible approach to antenna element selection by a wireless communication device (e.g., a UE) in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, a fifth generation (5G) New Radio (NR) network, or another type of network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the device may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some systems, millimeter wave (mmW) communications may occur in a frequency range (also known as "FR2") that exists above 24 GHz (which may include portions of the total frequency range that are within the millimeter band as well as near the millimeter band). In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antenna elements or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antenna elements of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In the wireless communications system 100, one or more of the UEs 115 may be configured to dynamically select a number of antenna elements to use for downlink reception based on one or more channel quality metrics. For example, a UE 115 may have a beamformed communication with a base station 105 via a communication link 125 (e.g., a mmW communication path). The base station 105 may send a first signal to the UE 115 via the communication link 125. The UE 115 may use a first beam for beamformed wireless communication with the base station 105. The first beam may be supported with a first number of antenna elements. The UE 115 may determine a channel quality metric (e.g., one or more of reference signal received power (RSRP), a signal-to-noise ratio (SNR or SINR), or spectral efficiency) associated with a downlink channel on the communication link 125. The UE 115 may then compare the channel quality metric with a channel quality threshold and adjust a number of antenna elements used for an upcoming reception opportunity based on the threshold comparison result. When the threshold comparison indicates that the channel quality is relatively high (e.g., potentially higher than needed to support the desired level of quality), then the UE 115 may reduce the number of antenna elements used for beamformed wireless communication from the base station 105 to the UE 115. When the threshold comparison indicates that the channel quality is relatively low (e.g., potentially lower than needed to support the desired level of quality), then the UE 115 may increase the number of antenna elements used for beamformed wireless communication from the base station 105 to the UE 115. When the threshold comparison indicates that the channel quality is somewhere in the middle (e.g., indicating that the current beam is providing the desired level of quality without deviating too far in either direction), then the UE 115 may keep the same number of antenna elements used for beamformed wireless communication from the base station 105 to the UE 115 as were used for the last incoming communication. Further details of the antenna element selection algorithms are described in more detail below.

Figure 2:
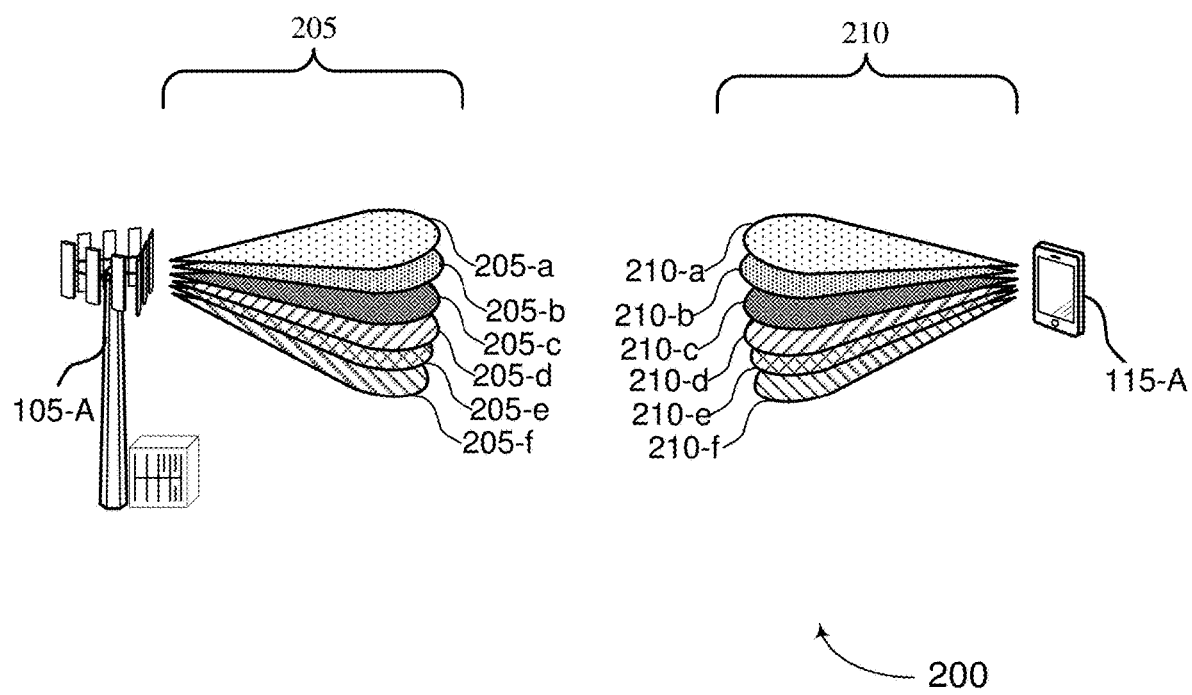
FIG. 2 illustrates an example of a portion of a wireless communications system that uses beamformed transmissions and that supports beam management techniques based on one or more channel quality determinations.

FIG. 2 illustrates an example of a portion of a wireless communications system 200 that uses beamformed transmissions and that supports beam management techniques based on one or more channel quality determinations. In some examples, wireless communications system 200 may implement aspects of wireless communications system 100. In the example of FIG. 2, wireless communications system 200 may include base station 105-a and UE 115-a, which may be examples of the corresponding devices described with respect to FIG. 1. In this example, UE 115-a and base station 105-a may use beamformed communications to establish a connection via one or more beams 205 at the base station and one or more beams 210 at the UE.

In some cases, base station 105-a and UE 115-a may establish communication via a beam pair link using a base station beam 205 and a UE beam 210 that are determined based on a beam training procedure (e.g., a P1 beam training procedure, a P2/P3 beam refinement procedure, etc.) in which the UE 115-a and base station 105-a may measure one or more parameters of beams transmitted in a beam sweep sequence. Such measurements may be used to determine a particular pair of beams that are to be used for communications. In some cases, one or more reference signals may be measured to determine one or more beams that are to be used for communications. For example, the base station 105-a may transmit a reference signal (e.g., one or more synchronization signals (SSs), channel state information reference signals (CSI-RSs), or combinations thereof) in one or more synchronization signal blocks (SSBs) on a series of beams 205 that may be measured at the UE 115-a to provide a measurement report that is used to select a preferred base station beam 205, preferred UE beam 210, or both (e.g., based on beam reciprocity assumptions).

In some cases, UE 115-a may have one or more constraints that may limit a number of available beams that the UE 115-a may use for beamformed communications. For example, the UE 115-a may be configured with maximum permissible exposure (MPE) limits that may apply to mmW transmission frequencies (i.e., FR2 frequencies) and may limit the uplink transmission power of UE 115-a and in some cases may prevent one or more UE beams 210 from being available for uplink transmissions. Additionally, or alternatively, UE 115-a may have one or more antenna panels or sub-arrays that each have an associated thermal sensor that provides thermal information associated with a panel or sub-array, and in the event that an associated temperature exceeds a threshold value, one or more antenna elements at the panel or sub-array may not be available for transmissions until the temperature falls back below the threshold value. Such thermal indications may thus limit one or more beams that are available to the UE 115-a due to constraints on the number of available antenna elements that may be used at the sub-array or panel. Further, in some cases UE 115-a may have a mobility sensor module that may indicate how fast the UE 115-a is moving relative to the base station 105-a, and a beam width of one or more beams may not be suitable based on UE 115-a mobility (e.g., relatively narrow beams may be available for transmissions when mobility is low, but unavailable when mobility is above a threshold value).

Additionally or alternatively, constraints on available beams at the UE 115-a may come from one or more other status indications, such as, for example, device restrictions of the UE 115-a (e.g., original equipment manufacturer (OEM) restrictions on numbers of available beams, combinations of antenna panels that may be used concurrently, and the like), power restrictions of the UE 115-a (e.g., power headroom that may limit a number of antenna elements that may be used for concurrent transmissions), downlink or uplink gain control restrictions (e.g., automatic gain control (AGC) or link budget limits that may limit a maximum downlink or uplink beam level), and the like. Further, in some cases different beam constraints may be present for different carrier frequencies that may be used for communications.

In some cases, UE 115-a may have multiple different modules that provide such status indications, and a codebook manager may receive the different status indications and aggregate them to provide a subset of available beams at the UE 115-a. For example, the codebook manager may provide the subset of available beams to one or more beam management modules (e.g., beam measurement modules, beam selection modules, beam preparation modules (for preparing beams for future use), and the like) which can include any module that evaluates or compares UE beams for use by the UE 115-a for any purpose, including both communication and other purposes including, for example, measurement and selection of one or more beams for wireless communications between the UE 115-a and base station 105-*a*. In such a manner, multiple different beam management processes at the UE 115-*a* may use a same subset of available beams, which may enhance UE 115-*a* efficiency through consistent information provided by a single codebook manager, rather than the multiple different modules having to identify different constraints individually.

Another input to the beam management and selection processes may be based on a channel quality determination. For example, in the wireless communications system 200, the UE 115-*a* may prefer selection of a beam with a certain number of antenna elements to use for downlink reception. The preferred number of antenna elements may be determined based on a comparison between a channel quality metric and a channel quality threshold. The preferred number of antenna elements may also be selected based on a balance between performance (achieved with a higher number of antenna elements) and other benefits, such as power savings (achieved with a lower number of antenna elements). When the channel quality threshold comparison indicates that the channel quality of the current beam is over a threshold (e.g., the threshold set at a level indicating relatively high quality), the UE may indicate to the codebook manager (or other UE component) its preference for a receive beam with less antenna elements than the last used receive beam. For example, if the last beam used 4 antenna elements, then the UE may indicate a desire for a beam with 3, 2, or 1 antenna elements. On the other hand, when the channel quality threshold comparison indicates that the channel quality of the current beam is below a threshold (e.g., the threshold set at a level indicating relatively low quality), the UE may indicate to the codebook manager (or other UE component) its preference for a receive beam with more antenna elements than the last used receive beam. For example, if the last beam used 2 antenna elements, then the UE may indicate a desire for a beam with 3, 4, or a higher number of antenna elements.

Figure 3:
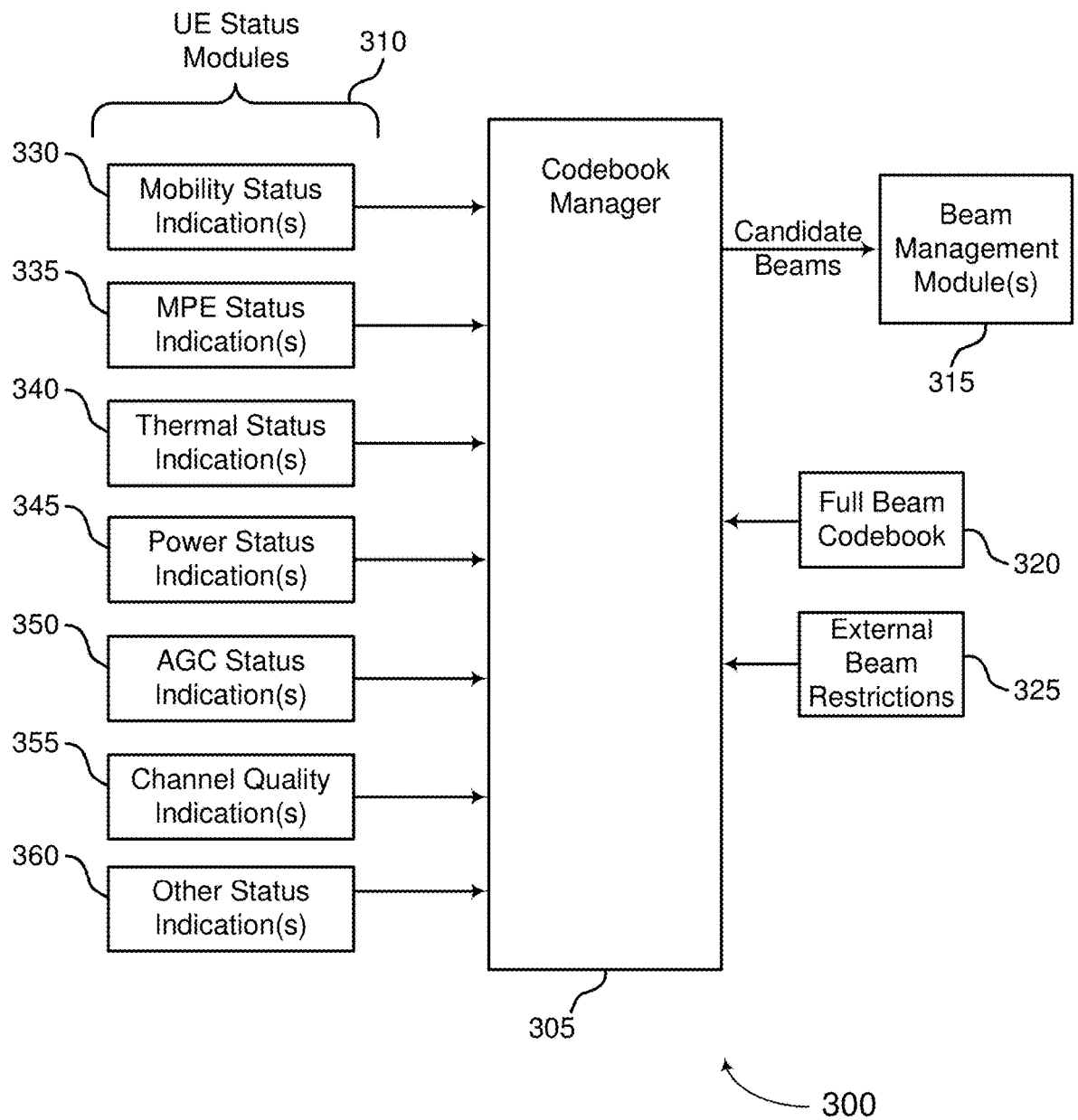
FIG. 3 illustrates an example of a codebook manager that supports beam management techniques based on one or more channel quality determinations.

FIG. 3 illustrates an example of a system 300 that includes a codebook manager 305 that supports beam management techniques based on one or more channel quality determinations (and optionally one or more other beam management and selection indications). In some examples, system 300 may implement aspects of wireless communications system 100 or 200. In some cases, aspects of system 300 may be implemented in a UE (e.g., a UE 115 of FIG. 1 or 2). In this example, a codebook manager 305 may receive inputs from a number of UE status modules 310 that are used to provide an indication of a status where each module is associated with a different category of metrics that are used for beam selection.

As discussed herein, in some cases a UE may communicate with a base station using one or more beams that are selected based on one or more measurements from a beam training or beam refinement procedure. In the example of FIG. 3, the codebook manager 305 at a UE may identify a full beam codebook 320 (and/or receive the full beam codebook 320 from an external module or retrieve the full beam codebook 320 from external or internal storage) that indicates a set of all possible beams for communications at the UE based on multiple antenna elements at one or more antenna arrays or sub-arrays of the UE. A group of antenna elements, which may include two or more antenna elements in one or more antenna arrays or sub-arrays may be referred to herein as an antenna panel, which may correspond to a physical antenna panel or hardware module at a UE or to a virtual antenna panel that may include two or more antenna elements that are a subset of antenna elements at a physical antenna module or that span multiple antenna modules.

Various antenna elements at one or more antenna panels may be used for a particular beam, and a codebook of all possible beams may be provided to the UE as full beam codebook 320, which may include one or more predetermined codebooks that may be indicated or selected for communications (e.g., a codebook of 64 available beams).

The codebook manager 305, in this example, may determine one or more beams that are to be removed from the set of beams of the full beam codebook 320, and a subset of available beams provided to one or more beam management module(s) 315. The codebook manager 305 may, in some cases, aggregate one or more status indications or constraints that are received from UE status modules 310, an external beam restriction indication 325, or combinations thereof. The external beam restriction may correspond to, for example, OEM restrictions on one or more beams that may be transmitted by the UE.

Further, a number of UE status modules 310 may provide status indications to the codebook manager 305 that may further limit the number of available beams at the UE. In this example, the codebook manager 305 may receive one or more of mobility status indications 330, MPE status indications 335, thermal status indications 340, power status indications 345, AGC status indications 350, channel quality indications 355, or other status indications 360. It is noted that the UE status modules 310 that provide status indications illustrated in FIG. 3 are provided for purposes of discussion and illustrations, and more, fewer, or different UE status modules 310 may provide inputs to a codebook manager 305 in other examples.

In some cases, the mobility status indications 330 may indicate one or more beam widths that are supported by the UE based on UE mobility (e.g., narrower beam widths may be available for relatively low levels of mobility and only wider beam widths may be available for relatively high levels of mobility). MPE status indications 335 may indicate that one or more antenna panels or antenna elements may be unavailable due to MPE limits of the UE, which the codebook manager 305 may use to determine one or more beams that are unavailable. Thermal status indications 340 may indicate thermal conditions at the UE, such as thermal status of one or more antenna panels. For example, the thermal status may indicate that one or more antenna elements at a panel are unavailable due to a thermal status of the panel being above a threshold, and thus one or more beams associated with the panel may be unavailable to the UE. Power status indications 345 may indicate a power status of the UE is at a level where one or more beams are not supported. AGC status indications 350 may indicate beam constraints based on AGC settings at the UE. Channel quality status indications 355 may provide a channel quality information and/or an indication of a desired number of antenna elements required for the preferred beam as determined from a channel quality assessment (e.g., see the process from FIGS. 5-8). Other status indications 360 may include any other status of the UE that impacts beam availability at the UE, such as, for example, different beam constraints that may be present for different carrier frequencies that may be used for communications.

The codebook manager 305 may aggregate the restrictions, preferences, and status indications to identify the subset of available beams, which may be provided to the one or more beam management modules 315 as the subset of available beams. The one or more beam management modules 315 may perform beam evaluation, beam comparison, beam selection, and/or beam processing based on the subset of available beams. Such beam management modules may include, for example, a beam selector that recommends beams for communication and/or signaling (e.g., selecting or recommending shared channel beams and/or control channel beams) based on one or more beam measurements and the like. In some cases, the codebook manager 305 may, based on the provided status indications, identify associated beam constraints, generate two or more sets of beams based on the status indications, and perform set difference, intersection, and/or union operations on the two or more sets of beams to determine the subset of beams, which may be used for scheduling beam measurements to identify beams with highest gain measurements to the base station. In some cases, the system 300 is a feedthrough architecture that allows each of the UE status modules 310 to be independent, and allow for beam management modules to identify a particular status if needed. In some cases, any and all beam management modules 315 of the UE use the subset of beams identified by the codebook manager 305 and do not use any other module or source for determining the subset of beams and/or do not independently or separately determine the subset of beams. In some implementations, the subset of beams comprises a single subset of beams used by all one or more beam management modules 315 of the UE.

Figure 4:
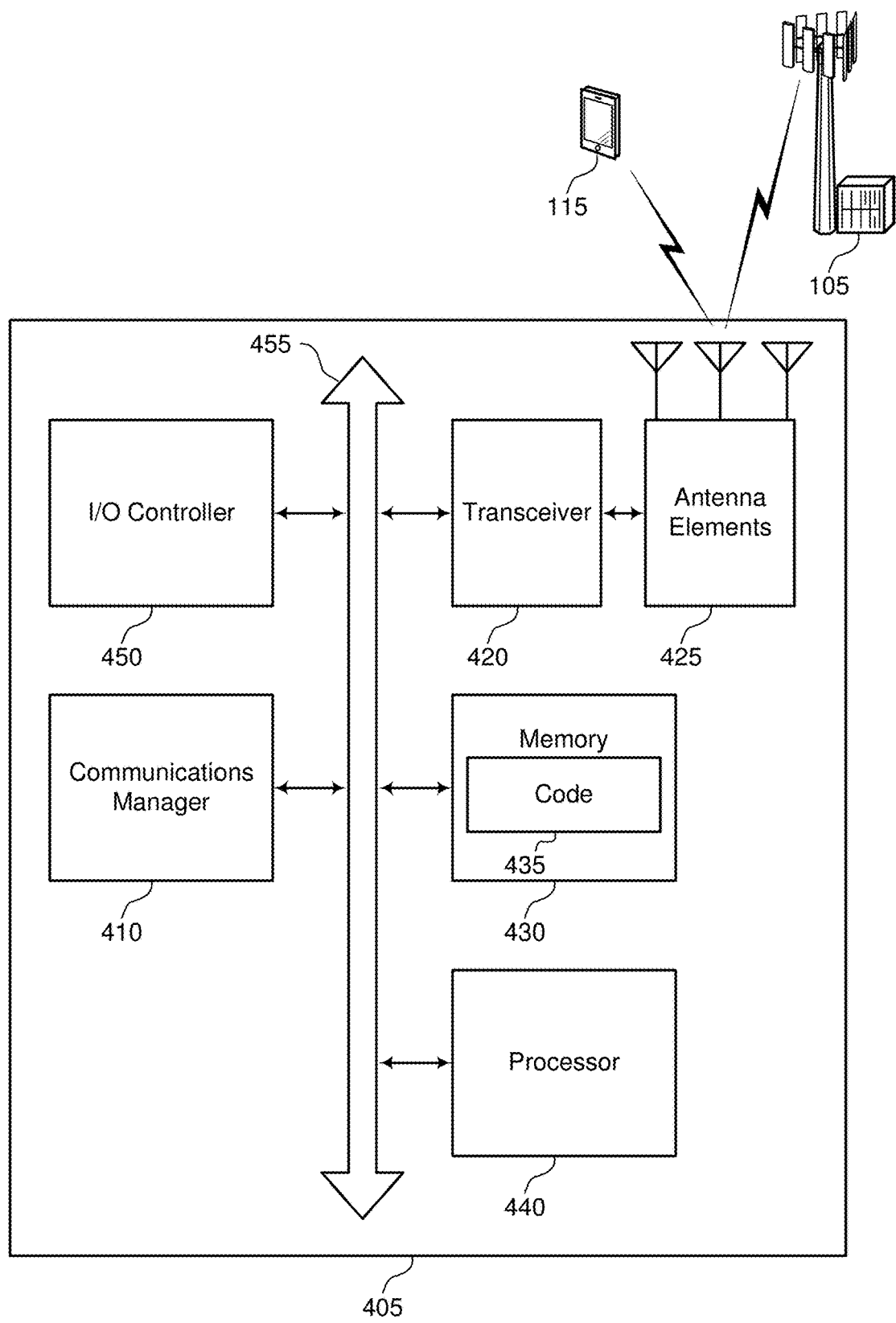
FIG. 4 is a diagram of a wireless communication device configured to support antenna element selection based on channel quality.

FIG. 4 is a diagram of a system 400 including a device 405 that is configured to select a beam with a desired number of antenna elements for receiving a communication from another device in accordance with aspects of the present disclosure. The device 405 may be an example of a UE 115 as described in connection with FIGS. 1 and 2. The device 405 may include components for bi-directional voice and data communications including components for transmitting and receiving communications, including one or more communications managers 410, one or more transceivers 420, one or more antennas 425, one or more memory devices 430, one or more processors 440, and one or more I/O controllers 450. These components may be in electronic communication via one or more buses (e.g., bus 455).

The communications manager 410 may manage the process of generating signals, transmitting signals, receiving signals, and processing the received signals. The communication manager 410 may also manage the beam selection process for device 405. The communications manager 410 may work in connection with other components of device 405 (e.g., the processor 440, the transceiver 420, the antenna elements 425, and other RF chain elements) to perform the various communication functions described herein. When operating as part of a beam selection system at device 405, the communications manager 410 may manage the process of determining a desired number of antenna elements based on one or more channel quality determinations (e.g., as described below in connection with FIGS. 5-8). The communications manager 410 may comprise its own processor or may be a functional component of processor 440.

Transceiver 420 may communicate bi-directionally, via one or more antenna elements (e.g., antenna elements 425). For example, the transceiver 420 may represent a wireless transceiver and may communicate bi-directionally with another wireless transceiver. The transceiver 420 may also include a modem to modulate the packets and provide the modulated packets to the antenna elements for transmission, and to demodulate packets received from the antenna elements. When operating as part of a beam selection system at device 405, the transceiver 420 may receive reference signals from a base station. The received reference signals may be used at the device 405 (e.g., the processor 440 or communications manager 410) to determine downlink channel quality. The transceiver 420 may also receive various content signals (user data, control information, or both) using a receive beam selected by the device 405 based on one or more channel quality determinations. The transceiver 420 may send the received signals to another component (e.g., the processor 440 or communications manager 410) for further processing.

The device 405 may have multiple antenna elements 425, which may be capable of concurrently transmitting or receiving multiple wireless transmissions. The antenna elements 425 may be organized within one or more antenna arrays or panels. When operating as part of a beam selection system at device 405, the antenna elements 425 may receive radio waves that correspond to the content of a downlink signal or reference signal, and pass the received signals to the transceiver 420 for further processing.

The memory 430 may include RAM, ROM, or a combination thereof. The memory 430 may store computer-readable code 435 including instructions that, when executed by a processor (e.g., the processor 440 or another processor in the device 405, such as a processor associated with the transceiver 420, modem, or communication manager 410) to cause the device 405 to perform various communication functions described herein (e.g., the functions described in connection with FIGS. 5-8). In some cases, the memory 430 may contain, among other things, a BIOS which may control basic hardware or software operation such as the interaction with peripheral components or devices. The memory 430 may also include instructions to cause the device 405 to perform the beam management and selection features described herein.

The code 435 may include instructions to implement aspects of the present disclosure, including instructions to manage beam selection and otherwise support wireless communications. The code 435 may be stored in a non-transitory computer-readable medium such as system memory or other type of memory. In some cases, the code 435 may not be directly executable by the processor 440 but may cause a device (e.g., when compiled and executed) to perform functions described herein.

The processor 440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 440 may be configured to operate a memory array using a memory controller. In other cases, a memory controller may be integrated into the processor 440. The processor 440 may be configured to execute computer-readable instructions stored in a memory (e.g., the memory 430) to cause the device 405 to perform various functions (e.g., the functions described in connection with FIGS. 5-8).

The I/O controller 450 may manage input and output signals for the device 405. The I/O controller 450 may also manage peripherals not integrated into the device 405. In some cases, the I/O controller 450 may represent a physical connection or port to an external peripheral. In some cases, the I/O controller 450 may utilize an operating system such as iOS®, ANDROID®, MS-DOS®, MS-WINDOWS®, OS/2®, UNIX®, LINUX®, or another known operating system. In other cases, the I/O controller 450 may represent or interact with a modem, a keyboard, a mouse, a touchscreen, or a similar device. In some cases, the I/O controller 450 may be implemented as part of a processor. In some cases, a user may interact with the device 405 via the I/O controller 450 or via hardware components controlled by the I/O controller 450.

The components of device 405 illustrated in FIG. 4 may be combined together into a smaller number of components, or the functions described herein may be split into a greater number of components. As one example, regarding the ability to combine functions, the functions of the I/O controller 450 and/or the functions of the communication manager 410 may be consolidated together with other control and processing functions and performed by the processor 440 (based on instructions stored in memory 430). Thus, the configuration shown in FIG. 4 represents one example configuration and additional structural configurations are intended to be within the scope of the present disclosure.

Figure 5:
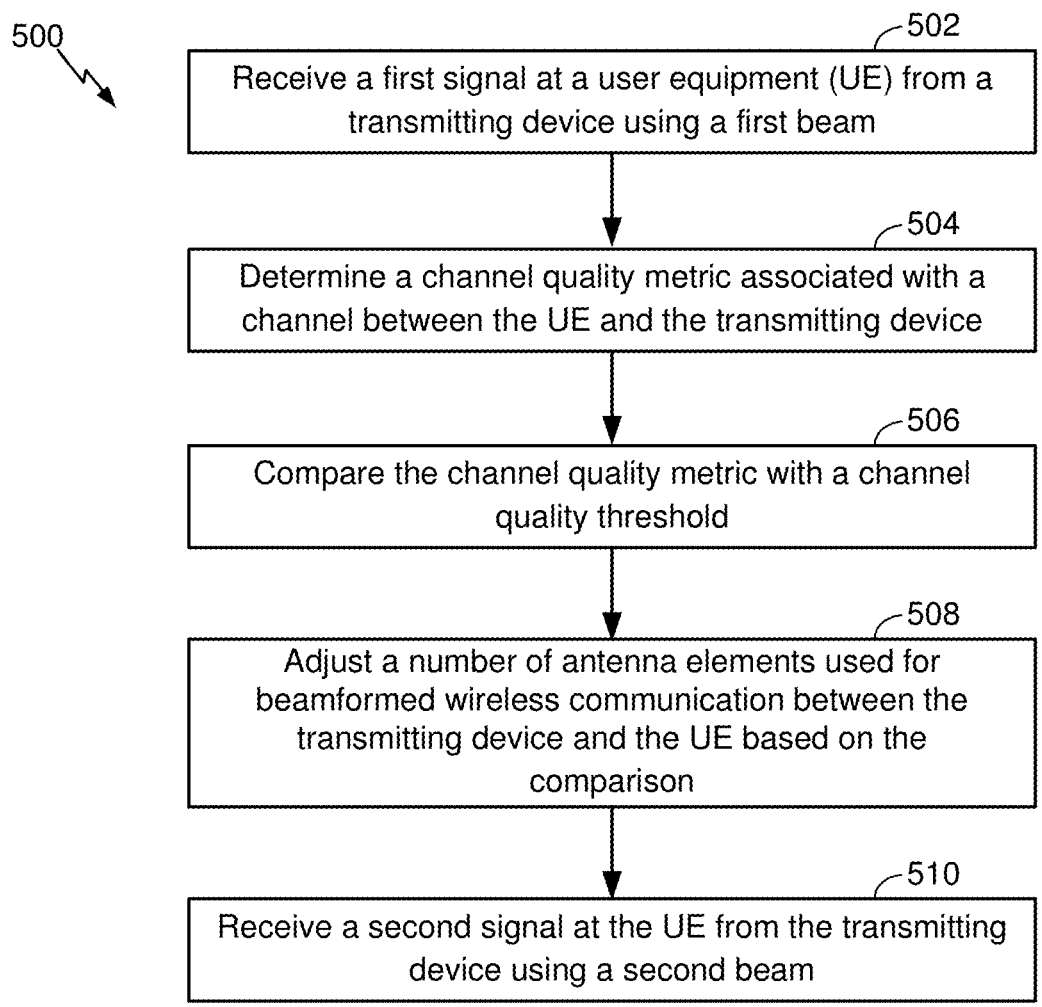
FIG. 5 is a flow diagram illustrating one example of a technique for adjusting a number of antenna elements used for beamformed wireless communication between a transmitting device and a receiving device.

FIG. 5 is a flow diagram illustrating one example of a process 500 for adjusting a number of antenna elements used for beamformed wireless communication between a transmitting device and a receiving device. The process 500 may be performed by a wireless communication device, such as a UE (e.g., UE 115 of FIG. 1, UE 115-a of FIG. 2, or device 405 of FIG. 4). In some implementations, the features in the steps shown in process 500 may performed by one or more components of device 405 as described in FIG. 4. For example, the processing steps of process 500 may be performed by the processor 440 coupled with memory 430 that includes instructions executable by the processor 440 to cause the device (e.g., UE) to perform the recited processing steps. As another example, the signal reception steps may be performed by a combination of one or more of the processor 440 (including instructions stored on memory 430), transceiver 420, and antenna elements 425 (along with other components in the receive-side radio frequency chain of the device). Additionally, or alternatively, a UE may perform aspects of the functions described in process 500 using special-purpose hardware.

At step 502, the UE receives a first signal from a transmitting device (e.g., a base station) using a first beam for beamformed wireless communication between the transmitting device and the UE. The first signal may be a beamformed millimeter wave (mmW) signal or a signal in a different frequency range. The first signal may include user data, control information, or both. Alternatively, the first signal may be a reference signal or another waveform type. The first signal is received by at least one antenna element of the UE, processed by at least one radio frequency front end (RFFE) component of the UE, processed by at least one transceiver component of the UE, and processed by at least one modem of the UE.

The first beam used for reception at step 502 is supported by a first set of one or more antenna elements of the UE. In a first example, the first beam may have been selected as the beam determined to have a largest (e.g., maximum) beamforming gain relative to other candidate beams. In a second example, the first beam may have been selected as the beam determined to have a highest quality metric of the candidate beams for the planned signal reception. In a third example, the first beam may have been selected as the beam determined to have a largest (e.g., maximum) number of antenna elements available for the planned signal reception. In these examples, the selected first beam may be selected as an optimal choice for beamforming quality performance (e.g., it was determined to be the best available beam of the beam candidates). In another example, the first beam may have been selected as a non-optimal choice for beamforming quality performance. For example, the beam may not be determined to be the best available beam of the beam candidates based on certain performance characteristics, but was preferred based on other factors, such as resulting in a lower power consumption.

At step 504, the UE determines a channel quality metric associated with a channel between the UE and the transmitting device. For example, the UE may determine a channel quality metric associated with the first beam that was used to receive the first signal at step 502. The channel quality metric may be determined by accessing the latest quality metric associated with a beam of interest stored in a memory device of the UE. Alternatively or additionally, the channel quality metric may be determined by receiving a reference signal on the first beam transmitted from a base station to the UE and measuring the channel quality at the UE based on the reference signal. The UE may then generate a metric quantifying the measured channel quality. The reference signal sent by the base station may be a synchronization signal block (SSB), a channel state information reference signal (CSI-RS), or a demodulation reference signal (DMRS).

In one implementation, the channel quality metric is a received power measurement (e.g., RSRP or the like) associated with a reference signal transmitted from a base station to the UE. In another implementation, the channel quality metric is a signal-to-noise ratio measurement (e.g., SNR or SINR or the like) associated with a reference signal transmitted from a base station to the UE. In yet another implementation, the channel quality metric is a spectral efficiency measurement (e.g., a Shannon capacity computed on the frequency domain channel) associated with a reference signal transmitted from a base station to the UE. In other implementations, the system may consider multiple channel quality metrics, and may consider a combination of a received power measurement, a signal-to-noise ratio measurement, a spectral efficiency measurement, another type of channel quality metric, or any other quality metric.

The channel quality metric determined at step 504 may be an instantaneous quality metric or may be an averaged quality metric (or with some other type of metric filtering applied). As one example of the instantaneous quality metric option, the channel quality metric represents a single channel quality measurement (e.g., a metric calculated from the most recent measurement). As one example of the averaged quality metric option, the channel quality metric represents a time averaged version or a weighted time averaged version of a channel quality metric. For example, the weighted time averaged version may set different weightings for multiple different samples according to the relative amount of time that has passed since each sample was taken. Alternatively, the weighting may be the same for each sample. The channel quality metric determined at step 504 and used for the other processing in FIGS. 5-8 may take the form of any of these types of channel quality metrics or any other form of metric that represents a quality measurement or estimation for the relevant communication channel.

At step 506, the UE compares the channel quality metric with a channel quality threshold. In some implementations, a UE may be pre-configured with a stored threshold lookup table (or other accessible database or stored) that stores a set of channel quality thresholds that are usable for the threshold comparisons at step 506. The UE's selection of which one or more thresholds are relevant to the comparison in step 506 may be determined based on one or more factors.

As one example, the UE may be configured with different thresholds that vary based on being associated with different candidate beams. In this example, the one or more thresholds used for comparisons associated with one beam may be different than the one or more thresholds used for comparisons associated with a different beam. Thus, when comparing the channel quality metric with the channel quality threshold at step 506, the UE may retrieve the relevant channel quality threshold from a lookup table based on an identification of the first beam (e.g., by keying the lookup to a beam index associated with the first beam).

As another example, the UE may be configured with different thresholds that vary based which type of reference signal was used to determine the channel quality metric at step 506. For example, some reference signal types may be transmitted at a different power level (or some other transmission characteristic) than other reference signal types and thus the thresholds may take this difference in consideration. In this example, the one or more thresholds used for comparisons associated with quality measurements for one reference signal type may be different than the one or more thresholds used for comparisons associated with quality measurements for a different type of reference signal (even when considering the same beam). Thus, when comparing the channel quality metric with the channel quality threshold at step 506, the UE may retrieve the relevant channel quality threshold from a lookup table based on an identification of the reference signal type used for the quality determination (e.g., by keying the lookup to an identifier associated with the relevant reference signal type). In other implementations, both the beam index and reference signal type identifier may both be used to determine which one or more thresholds are relevant for the comparison at step 506.

As yet another example, the UE may be configured with different thresholds that vary based which type of channel quality metric is being considered. For example, the UE may have a set of one or more thresholds for a given beam and given reference signal type for a first channel quality metric (e.g., received power) and a different set of one or more thresholds for a given beam and given reference signal type for a different channel quality metric (e.g., signal-to-noise ratio). When a certain channel quality metric is being considered in the comparison of step 506, then the UE will retrieve the one or more thresholds relevant to that metric.

The one or more channel quality thresholds used at step 506 may be fixed values at the UE that do not change over time for all threshold comparisons by the UE that are associated with the first beam and a type of reference signal used for determining the channel quality metric. In some implementations, the comparison between a channel quality threshold associated with a first candidate beam and a channel quality metric associated with that same first beam at step 506 is not a comparison between a channel quality metric associated with the first candidate beam and a channel quality metric associated with a different candidate beam (e.g., the comparison is between a quality metric and a threshold, and not a comparison between two quality metrics of different beams). In one implementation, all threshold comparisons associated with one specific beam and one specific reference signal type used for the channel quality determination may all use the same one or more thresholds (assuming the same type of channel quality metric is at issue). However, when the UE is considering channel quality measurements associated with a different beam or based on a different reference signal, then the one or more channel quality thresholds used at step 506 may be different than the ones used for the first beam or a when a different type of reference signal was the source of the channel quality determination.

The channel quality thresholds used by the UE in its antenna element selection process may be configured at the UE based on one or more factors. For example, the thresholds may be set based on one or more of a characteristic of the candidate beam being considered, a characteristic of a radio frequency component of the UE, or a type of reference signal used for channel quality measurement. The level of a threshold may depend on a characteristic of the associated beam, such as the number of antenna elements used for the beam. For example, a two element beam may have different performance characteristics than a four or eight or sixty-four element beam. These beam characteristic differences may be taken into consideration when setting the different thresholds to be used for these different beams. The level of a threshold may depend on a characteristic of a radio frequency component of the UE, such as a noise figure (e.g., amount of noise RF front end injects for different input power levels) or saturation level associated with the RF hardware of the UE. Higher quality RF hardware may have different performance characteristics than lower quality RF hardware. Those RF hardware differences may be taken into consideration when setting the levels of the thresholds for the UE. The level of a threshold may depend on which type of reference signal is used for channel quality measurement, as discussed above.

After the one or more relevant channel quality thresholds are determined (e.g., based on one or more of a type of channel quality metric measured, a type of reference signal used for the quality measurement, a beam index associated with the receive beam used for the quality measurement, or any other factors), then the UE compares the determined channel quality metric with the one or more relevant channel quality thresholds. At step 506, the UE may perform only one threshold comparison, or may perform multiple threshold comparisons. As one example, the UE may use two thresholds for one type of channel quality metric, as will be described in connection with FIG. 6. As another example, the UE may use only one of the two thresholds shown in FIG. 6. As yet another example, the UE may use more than two thresholds for one type of channel quality metric, as will be described in connection with FIG. 7. As still yet another example, the UE may use threshold comparisons for multiple different types of channel quality metrics, as will be described in connection with FIG. 8. Based on the outcome of these one or more comparisons, the UE determines whether to adjust the number of antenna elements used for beamformed wireless communication between the transmitting device and the UE (e.g., relative to the number of antenna elements used for receiving the reference signal that was used for the channel quality determination).

At step 508, the UE adjusts a number of antenna elements used for beamformed wireless communication between the transmitting device and the UE when the comparison between the channel quality metric and the channel quality threshold at step 506 indicates a change may be beneficial. As a first example, the one or more threshold comparisons at step 506 may indicate that the channel quality would be high enough even with less antenna elements and thus a power savings could occur by reducing the number of antenna elements used for reception of a next signal. Alternatively, the one or more threshold comparisons at step 506 may indicate that the channel quality is not at the desired level and thus increasing the number of antenna elements would be preferred even though extra power would be used at the UE to support the extra antenna element(s) for reception of a next signal. Additionally, the one or more thresholds used for the comparison at step 506 may be set up as hysteresis thresholds allowing a channel quality range that does not yield any change in the number of antenna elements (as will be described in connection with FIGS. 6 and 7).

In one implementation, the adjustment made at step 508 may be based on a parent-child beam relationship defined in a codebook of the UE. The codebook defines the available beams and the number of antenna elements supporting each defined beam. The codebook may also include information to link a parent beam with a child beam. A parent beam may be a wide beam with relatively fewer antenna elements (as compared to the child beams). A parent beam may have one or more child beams that add one or more additional antenna elements to the set of antenna elements used by the parent beam. When a parent beam is being used, and the system determines that it would be beneficial (based on the comparison(s) of step 506) to increase the number of antenna elements for a next signal reception, then the UE may move from the parent beam to one of the pre-defined child beams. When a child beam is being used, and the system determines that it would be beneficial (based on the comparison(s) of step 506) to decrease the number of antenna elements for a next signal reception, then the UE may move from the child beam up to the pre-defined parent beam associated with the child beam. Other implementations may use different mechanisms to switch between wider and narrower beams. Additional details regarding the possible antenna element number adjustments (or lack of adjustment) will be described further below in connection with FIGS. 6-8.

At step 510, the UE receives a second signal from the transmitting device using a second beam for beamformed wireless communication between the transmitting device and the UE. The second signal may be a beamformed millimeter wave (mmW) signal or a signal in a different frequency range. The second signal may include user data, control information, or both. Alternatively, the second signal may be a reference signal or another waveform type. The second signal is received by at least one antenna element of the UE, processed by at least one radio frequency front end (RFFE) component of the UE, processed by at least one transceiver component of the UE, and processed by at least one modem of the UE.

The second beam used for reception at step 510 uses a second set of one or more antenna elements of the UE that has a different number of antenna elements than the first set of one or more antenna elements that was used for reception of the first signal at step 502. When the number of antenna elements is reduced at step 508, then the second set of antenna elements has less antenna elements than the first set of antenna elements. For example, the second set may be a sub-set of the first set. When the number of antenna elements is increased at step 508, then the second set of antenna elements has more antenna elements than the first set of antenna elements. For example, the second set may include all of the first set and one or more additional antenna elements.

The selection of the second beam for reception at step 510 may include determining that the first beam remains valid for beamformed wireless communication between the transmitting device and the UE for reception of the second signal, but that choosing the second beam would provide one or more other benefits. For example, the UE may select the second set of one or more antenna elements instead of the first set of one or more antenna elements for receiving the second signal based on the comparison of the channel quality metric with the channel quality threshold. In one example, the channel quality metric determined for the first beam may be higher than a channel quality metric associated with the second beam. However, the UE may still select the second beam to receive the second signal instead of the first beam, despite the channel quality metric of the first beam being higher than the channel quality metric of the second beam, based on a determination that the channel quality metric determined for the first beam exceeds the channel quality threshold (and thus sufficient quality may still be achieved with the less antenna elements of the second beam). In another example, the first beam may have a higher beamforming gain than the second beam. However, the UE may still select the second beam to receive the second signal instead of the first beam, despite the first beam having the higher beamforming gain, based on a determination that the channel quality metric determined for the first beam exceeds the channel quality threshold (and thus sufficient quality may still be achieved with the less antenna elements of the second beam).

Figure 6:
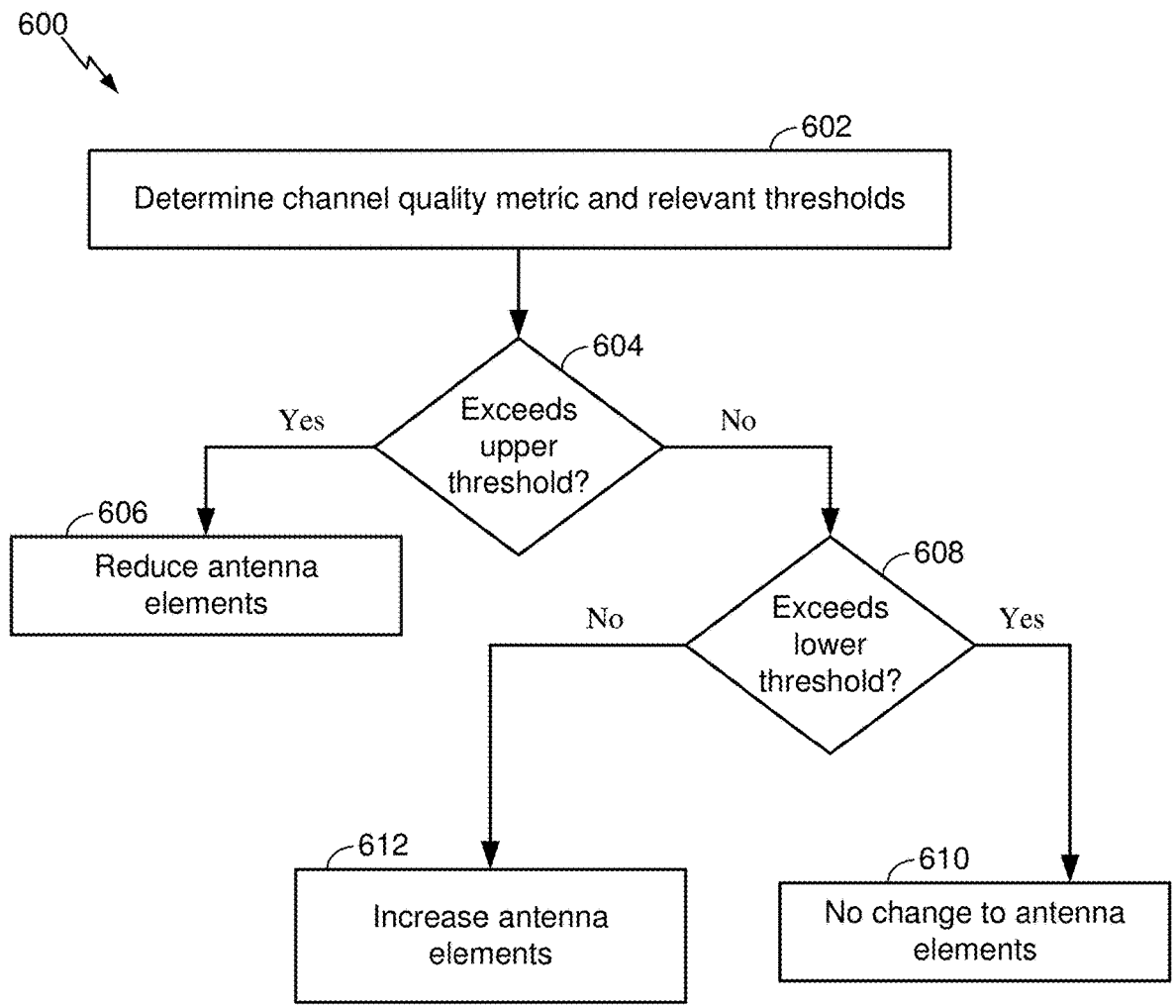
FIG. 6 is a flow diagram illustrating a first example of a technique for selecting a number of antenna elements based on a comparison between a channel quality metric and one or more channel quality thresholds.

FIG. 6 is a flow diagram illustrating a first example of a process 600 for selecting a number of antenna elements based on a comparison between a channel quality metric and one or more channel quality thresholds. The process 600 may be performed by a wireless communication device, such as a UE (e.g., UE 115 of FIG. 1, UE 115-a of FIG. 2, or device 405 of FIG. 4). In some implementations, the features in the steps shown in process 600 may performed by one or more components of device 405 as described in FIG. 4. For example, the processing steps of process 600 may be performed by the processor 440 coupled with memory 430 that includes instructions executable by the processor 440 to cause the device (e.g., UE) to perform the recited processing steps. As another example, the signal reception features (such as for a reference signal reception that may be a part of determining a channel quality metric, or for any signal reception that occurs based on the selected number of antenna elements) may be performed by a combination of one or more of the processor 440, transceiver 420, and antenna elements 425 (along with other components in the receive-side radio frequency chain of the device). Additionally, or alternatively, a UE may perform aspects of the functions described in process 600 using special-purpose hardware.

At step 602, the UE determines a channel quality metric and one or more relevant thresholds, as described in connection with steps 504 and 506 of FIG. 5. In the example of FIG. 6, two thresholds (an upper threshold and a lower threshold) related to one type of channel quality metric will be described, although other numbers of thresholds and quality metrics may also be considered as part of the beam selection process (e.g., as discussed below in connection with FIGS. 7 and 8).

At step 604, the UE compares the determined channel quality metric with a first threshold. The channel quality metric is associated with one candidate beam, which may be the beam used for the last downlink signal reception. In one example, the first threshold is an upper threshold that is higher than the lower threshold used at step 608.

If the determined channel quality metric exceeds the upper threshold, then step 604 proceeds to step 606. At step 606, the UE reduces the number of antenna elements used for receiving beamformed wireless communication between the transmitting device and the UE in response to a determination that the channel quality metric is above the upper quality threshold at step 604. The UE may reduce the number of antenna elements by requesting or selecting a beam with a reduced number of antenna elements relative to the beam used for the previous reception opportunity, such as a beam that uses a subset of the antenna elements used for the previous beam. The reduction in number of antenna elements may occur in increments of a single antenna element, or may occur in increments of multiple antenna elements.

In some implementations, the process 600 may also include a delay mechanism between step 604 and step 606. The delay mechanism may prevent immediate execution of the adjustment to the number of antenna elements used for reception. For example, the process 600 may include a counter that is incremented each time the comparison at step 604 results in finding that the channel quality metric exceeds the upper threshold. The delay mechanism would then compare the counter value with a counter threshold. If the counter value is below the threshold, then the process 600 would return to step 602 instead of executing a reduction at step 606. If the counter value satisfies the threshold, then process 600 allows step 604 to proceed to step 606 where the number of antenna elements would be reduced.

If the determined channel quality metric does not exceed the upper threshold, then step 604 proceeds to step 608. At step 608, the UE compares the determined channel quality metric with a second threshold. In one example, the second threshold is a lower threshold that is lower than the upper threshold used at step 604.

If the determined channel quality metric exceeds the lower threshold, then step 608 proceeds to step 610. At step 610, the UE elects to keep using the same number of antenna elements as used for reception of the last downlink signal in response to a determination that the channel quality metric is above the lower quality threshold at step 608. For example, the UE may keep using the same beam as used for the last downlink signal.

If the determined channel quality metric does not exceed the lower threshold, then step 608 proceeds to step 612. At step 612, the UE increases the number of antenna elements used for receiving beamformed wireless communication between the transmitting device and the UE in response to a determination that the channel quality metric is below the lower quality threshold at step 608. The UE may increase the number of antenna elements by requesting or selecting a beam with an increased number of antenna elements relative to the beam used for the previous reception opportunity, such as a beam that uses all of the antenna elements used for the previous beam and adds one or more additional antenna elements. The increase in number of antenna elements may occur in increments of a single antenna element, or may occur in increments of multiple antenna elements. In some implementations, the process 600 may also include a delay mechanism between steps 608 and 612, such as a counter and counter threshold comparison as discussed in more detail above as an option between steps 608 and 612. A similar mechanism could be used to determine whether to immediately increase or wait to increase the number of antenna elements.

Figure 7:
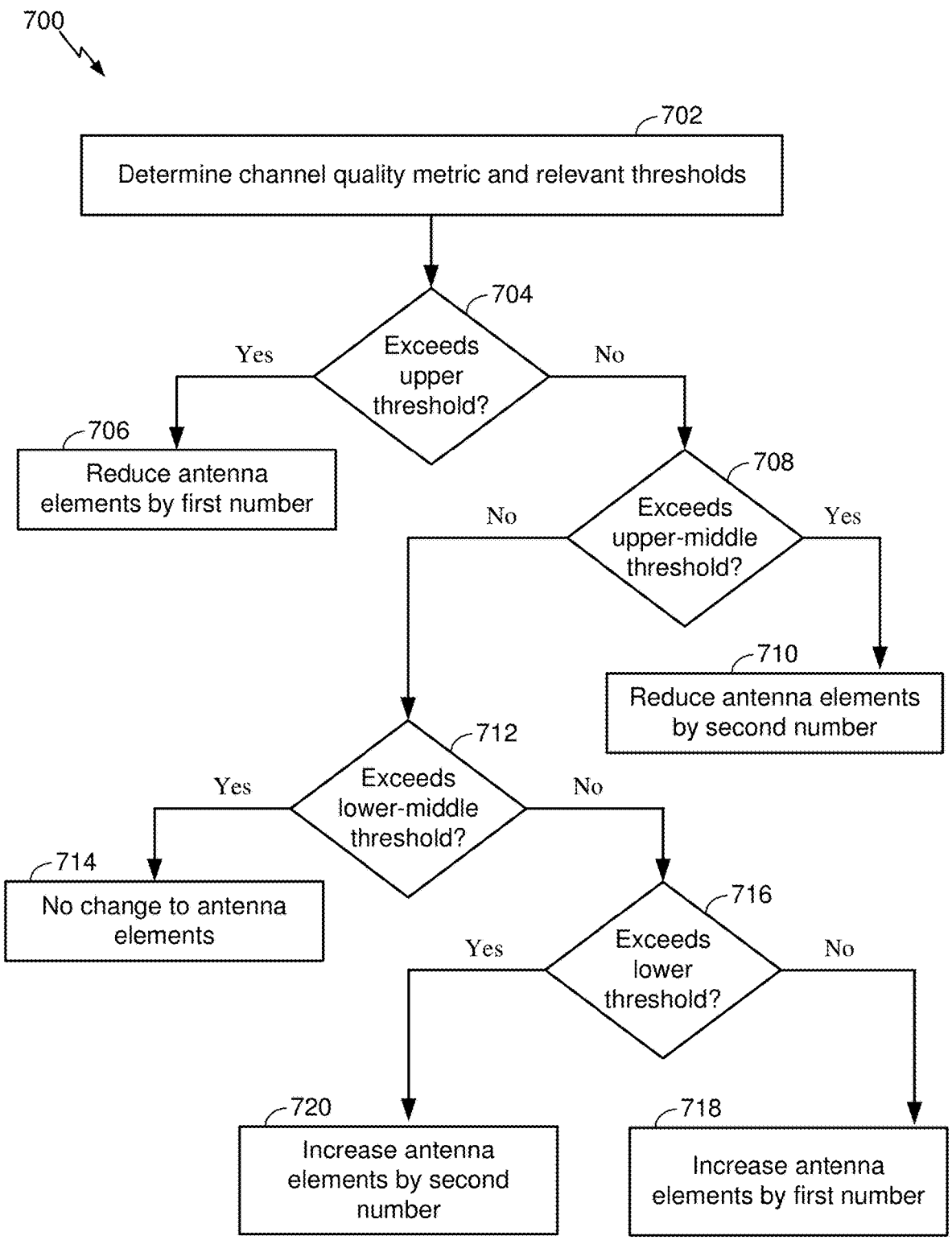
FIG. 7 is a flow diagram illustrating a second example of a technique for selecting a number of antenna elements based on a comparison between a channel quality metric and one or more channel quality thresholds.

FIG. 7 is a flow diagram illustrating a second example of a process 700 for selecting a number of antenna elements based on a comparison between a channel quality metric and one or more channel quality thresholds. The process 700 may be performed by a wireless communication device, such as a UE (e.g., UE 115 of FIG. 1, UE 115-a of FIG. 2, or device 405 of FIG. 4). In some implementations, the features in the steps shown in process 700 may performed by one or more components of device 405 as described in FIG. 4. For example, the processing steps of process 700 may be performed by the processor 440 coupled with memory 430 that includes instructions executable by the processor 440 to cause the device (e.g., UE) to perform the recited processing steps. As another example, the signal reception features (such as for a reference signal reception that may be a part of determining a channel quality metric, or for any signal reception that occurs based on the selected number of antenna elements) may be performed by a combination of one or more of the processor 440, transceiver 420, and antenna elements 425 (along with other components in the receive-side radio frequency chain of the device). Additionally, or alternatively, a UE may perform aspects of the functions described in process 700 using special-purpose hardware.

At step 702, the UE determines a channel quality metric and one or more relevant thresholds, as described in connection with steps 504 and 506 of FIG. 5. In the example of FIG. 7, four thresholds (an upper threshold, an upper-middle threshold, a lower-middle threshold, and a lower threshold) related to one type of channel quality metric will be described, although other numbers of thresholds and quality metrics may also be considered as part of the beam selection process.

At step 704, the UE compares the determined channel quality metric with a first threshold. The channel quality metric is associated with one candidate beam, which may be the beam used for the last downlink signal reception. In one example, the first threshold is an upper threshold that is higher than the other thresholds used at steps 708, 712, and 716.

If the determined channel quality metric exceeds the upper threshold, then step 704 proceeds to step 706. At step 706, the UE reduces the number of antenna elements used for receiving beamformed wireless communication between the transmitting device and the UE by a first number of antenna elements in response to a determination that the channel quality metric is above the upper quality threshold at step 704. The reduction in number of antenna elements may be set to achieve a relatively faster reduction as compared to the reduction that would occur at step 710. For example, the first number of antenna elements is larger than the second number of antenna elements at step 710. In one specific example, the first number may be two or four, or eight (or any other number greater than one). The UE may reduce the number of antenna elements by requesting or selecting a beam with a reduced number of antenna elements relative to the beam used for the previous reception opportunity, such as a beam that uses a subset of the antenna elements used for the previous beam.

If the determined channel quality metric does not exceed the upper threshold, then step 704 proceeds to step 708. At step 708, the UE compares the determined channel quality metric with a second threshold. In one example, the second threshold is an upper-middle threshold that is lower than the upper threshold used at step 704 but higher than the thresholds used at steps 712 and 716.

If the determined channel quality metric exceeds the upper-middle threshold, then step 708 proceeds to step 710. At step 710, the UE reduces the number of antenna elements used for receiving beamformed wireless communication between the transmitting device and the UE by a second number of antenna elements in response to a determination that the channel quality metric is above the upper-middle quality threshold at step 708. The reduction in number of antenna elements may be set to achieve a relatively slower reduction as compared to the reduction that would occur at step 706. For example, the second number of antenna elements is less than the first number of antenna elements at step 706. In one specific example, the second number may be one (with the first number greater than one), two (with the first number greater than two), four (with the first number greater than four), or any other number less than the first number of antenna elements. The UE may reduce the number of antenna elements by requesting or selecting a beam with a reduced number of antenna elements relative to the beam used for the previous reception opportunity, such as a beam that uses a subset of the antenna elements used for the previous beam.

If the determined channel quality metric does not exceed the upper-middle threshold, then step 708 proceeds to step 712. At step 712, the UE compares the determined channel quality metric with a third threshold. In one example, the third threshold is a lower-middle threshold that is lower than the upper threshold used at step 704 and the upper-middle threshold used at step 708, but higher than the threshold used at step 716.

If the determined channel quality metric exceeds the lower-middle threshold, then step 712 proceeds to step 714. At step 714, the UE elects to keep using the same number of antenna elements as used for reception of the last downlink signal in response to a determination that the channel quality metric is above the lower-middle quality threshold at step 712. For example, the UE may keep using the same beam as used for the last downlink signal.

If the determined channel quality metric does not exceed the lower-middle threshold, then step 712 proceeds to step 716. At step 716, the UE compares the determined channel quality metric with a fourth threshold. In one example, the fourth threshold is a lower threshold that is lower than the thresholds used at steps 704, 708, and 712.

If the determined channel quality metric does not exceed the lower threshold, then step 716 proceeds to step 718. At step 718, the UE increases the number of antenna elements used for receiving beamformed wireless communication between the transmitting device and the UE by a first number of antenna elements in response to a determination that the channel quality metric is below the lower quality threshold at step 716. The increase in number of antenna elements may be set to achieve a relatively faster increase as compared to the increase that would occur at step 720. For example, the first number of antenna elements is larger than the second number of antenna elements at step 720. In one specific example, the first number may be two or four, or eight (or any other number greater than one). The UE may increase the number of antenna elements by requesting or selecting a beam with an increased number of antenna elements relative to the beam used for the previous reception opportunity, such as a beam that uses all of the antenna elements used for the previous beam plus one or more additional antenna elements.

If the determined channel quality metric exceeds the lower threshold, then step 716 proceeds to step 720. At step 720, the UE increases the number of antenna elements used for receiving beamformed wireless communication between the transmitting device and the UE by a second number of antenna elements in response to a determination that the channel quality metric is above the lower quality threshold at step 716. The increase in number of antenna elements may be set to achieve a relatively slower increase as compared to the increase that would occur at step 718. For example, the second number of antenna elements is less than the first number of antenna elements at step 718. In one specific example, the second number may be one (with the first number greater than one), two (with the first number greater than two), four (with the first number greater than four), or any other number less than the first number of antenna elements. The UE may increase the number of antenna elements by requesting or selecting a beam with an increased number of antenna elements relative to the beam used for the previous reception opportunity, such as a beam that uses all of the antenna elements used for the previous beam plus one or more additional antenna elements.

In some implementations, the process 700 may also include a delay mechanism between steps 704 and 706, between steps 708 and 710, between steps 716 and 718, and/or between steps 716 and 720. The delay mechanism may include a counter and counter threshold comparison as discussed in more detail above as an option between steps 608 and 612 (FIG. 6). A similar mechanism could be used for one or more of the potential adjustments in process 700 when deciding whether to immediately increase/decrease or wait to increase/decrease the number of antenna elements.

Figure 8:
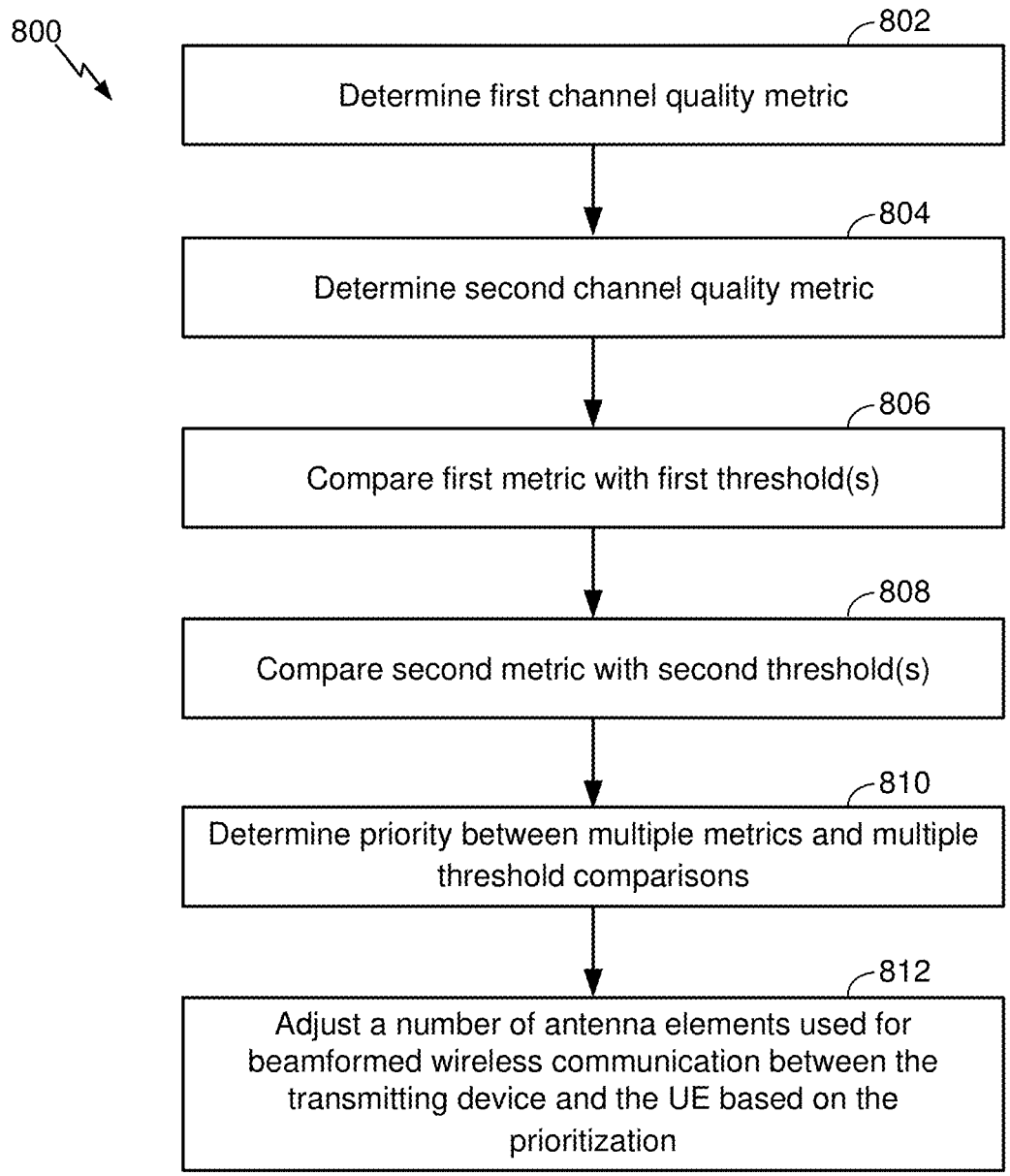
FIG. 8 is a flow diagram illustrating one example of a technique for determining a priority between multiple channel quality metrics.

FIG. 8 is a flow diagram illustrating one example of a process 800 for determining a priority between multiple channel quality metrics. The process 800 may be performed by a wireless communication device, such as a UE (e.g., UE 115 of FIG. 1, UE 115-*a* of FIG. 2, or device 405 of FIG. 4). In some implementations, the features in the steps shown in process 800 may performed by one or more components of device 405 as described in FIG. 4. For example, the processing steps of process 800 may be performed by the processor 440 coupled with memory 430 that includes instructions executable by the processor 440 to cause the device (e.g., UE) to perform the recited processing steps. As another example, the signal reception features (such as for a reference signal reception that may be a part of determining a channel quality metric, or for any signal reception that occurs based on the selected number of antenna elements) may be performed by a combination of one or more of the processor 440, transceiver 420, and antenna elements 425 (along with other components in the receive-side radio frequency chain of the device). Additionally, or alternatively, a UE may perform aspects of the functions described in process 800 using special-purpose hardware.

At step 802, the UE determines a first channel quality metric, as described in connection with step 504 of FIG. 5. At step 804, the UE determines a second channel quality metric, as described in connection with step 504 of FIG. 5. Both of the first channel quality metric and the second channel quality metric may be measured on the same receive beam, such as the last receive beam used for reception of a downlink signal (or the beam used to receive the reference signal that was measured for the channel quality metric). The second channel quality metric is of a different type of metric than the first channel quality metric. For example, the first channel quality metric may be a received power metric, and the second channel quality metric may be a signal-to-noise ratio. As another example, the first channel quality metric may be a signal-to-noise ratio, and the second channel quality metric may be a spectral efficiency metric. In other examples, any different combination of multiple types of channel quality metrics may be considered together in the process of FIG. 8. Additionally, more than two different quality metrics may be considered together.

At step 806, the UE compares the first channel quality metric with a set of one or more channel quality thresholds. As one example, the UE compares the first channel quality metric against only one threshold (e.g., either the upper threshold or the lower threshold of FIG. 6), against two thresholds (e.g., see FIG. 6), or against more than two thresholds (e.g., see FIG. 7). Similarly, at step 808, the UE compares the second channel quality metric with a set of one or more channel quality thresholds. As one example, the UE compares the second channel quality metric against only one threshold (e.g., either the upper threshold or the lower threshold of FIG. 6), against two thresholds (e.g., see FIG. 6), or against more than two thresholds (e.g., see FIG. 7). The set of one or more thresholds used for the second channel quality metric may be different than the set of one or more thresholds used for the first channel quality metric to account for the different relative quality levels associated with the different types of channel quality metrics.

The comparison of each channel quality metric to its respective channel quality threshold(s) may yield differing suggestions regarding the issue of whether to reduce, increase, or hold steady the number of antenna elements used for downlink reception relative to the number of antenna elements used for the receive beam associated with the channel quality metrics. Where at least one of the threshold comparisons yields a suggestion to reduce antenna elements (and there is not a contrary threshold comparison to increase antenna elements), then the UE may request or select a beam with a reduced number of antenna elements relative to the beam used for the channel quality determinations. Where at least one of the threshold comparisons yields a suggestion to increase antenna elements (and there is not a contrary threshold comparison to reduce antenna elements), then the UE may request or select a beam with an increased number of antenna elements relative to the beam used for the channel quality determinations. If the threshold comparisons yield conflicting suggestions, then the UE may determine a priority at step 810.

At step 810, the UE determines a priority between multiple channel quality metrics and multiple threshold comparisons. For example, the multiple threshold comparisons based on multiple different channel quality metrics may yield conflicting suggestions. In one example, the comparison of the first channel quality metric with the first channel quality threshold may indicate that the UE should increase the number of antenna elements used for beamformed wireless communication between the transmitting device and the UE, while the comparison of the second channel quality metric with the second channel quality threshold may indicate that the UE should decrease the number of antenna elements used for beamformed wireless communication between the transmitting device and the UE. This situation may occur when one metric (e.g., received power) is relatively low but another metric (e.g., signal-to-noise) is relatively high. When multiple threshold comparisons yield differing suggestions in this manner, the UE may prioritize the comparison that indicates that the UE should increase the number of antenna elements over the comparison that indicates that the UE should decrease the number of antenna elements. This prioritization allows the system to achieve a better beamforming performance across multiple different types of channel quality metrics. Based on this prioritization, at step 812, the UE requests or selects a receive beam with a higher number of antenna elements relative to the beam used to determine the channel quality metrics. In other implementations, different priority preferences may be selected based on competing goals of performance and power savings.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein, or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable sub-combination. As such, although features may be described above as acting in particular combinations, and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on. Furthermore, although certain aspects may be described or claimed in the singular, the plural is contemplated unless limitation to the singular is explicitly stated.

What is claimed is:

1. A method of wireless communication, comprising:
   receiving a first signal at a user equipment (UE) from a transmitting device using a first beam for beamformed wireless communication between the transmitting device and the UE, wherein the first beam uses a first set of one or more antenna elements of the UE;
   determining a channel quality metric associated with a channel between the UE and the transmitting device based on a measurement of a signal received from the transmitting device;
   identifying a type of the signal used for determining the channel quality metric;
   selecting a channel quality threshold from a plurality of different thresholds based on the identification of the type of the signal used for determining the channel quality metric;
   comparing the channel quality metric with the channel quality threshold;
   adjusting a number of antenna elements used for beamformed wireless communication between the transmitting device and the UE based on the comparison between the channel quality metric and the channel quality threshold; and
   receiving a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements based on the adjustment of the number of antenna elements used for beamformed wireless communication between the transmitting device and the UE.

2. The method of claim 1, wherein the channel quality metric is determined for the first beam, and the channel quality metric determined for the first beam is higher than a channel quality metric associated with the second beam, wherein receiving the second signal comprises:
   selecting the second beam to receive the second signal instead of the first beam, despite the channel quality metric of the first beam being higher than the channel quality metric of the second beam, based on a determination that the channel quality metric determined for the first beam exceeds the channel quality threshold.

3. The method of claim 1, wherein the channel quality threshold is fixed at the UE and does not change over time for all threshold comparisons by the UE that are associated with the first beam and a type of reference signal used for determining the channel quality metric; and
   wherein comparing the channel quality metric with the channel quality threshold comprises retrieving the channel quality threshold from a lookup table based on at least one of an identification of the first beam or an identification of the type of reference signal used for determining the channel quality metric.

4. The method of claim 1, wherein adjusting the number of antenna elements comprises:
   determining that the channel quality metric is above the channel quality threshold; and
   reducing, based on the determination that the channel quality metric is above the channel quality threshold, the number of antenna elements used for beamformed wireless communication between the transmitting device and the UE from the first set of one or more antenna elements to the second set of one or more antenna elements that has fewer antenna elements than the first set of one or more antenna elements.

5. The method of claim 1, wherein adjusting the number of antenna elements comprises:
   determining that the channel quality metric is below the channel quality threshold; and
   increasing the number of antenna elements used for beamformed wireless communication between the transmitting device and the UE from the first set of one or more antenna elements to the second set of one or more antenna elements that has more antenna elements than the first set of one or more antenna elements.

6. The method of claim 1, wherein the channel quality metric is a first channel quality metric and the channel quality threshold is a first channel quality threshold, the method further comprising:
   determining a second channel quality metric associated with the channel between the UE and the transmitting device, wherein the second channel quality metric is a different type of quality metric than the first channel quality metric; and
   comparing the second channel quality metric with a second channel quality threshold that is different than the first channel quality threshold;
   wherein the comparison of the first channel quality metric with the first channel quality threshold indicates that the UE should increase the number of antenna elements used for beamformed wireless communication between the transmitting device and the UE;
   wherein the comparison of the second channel quality metric with the second channel quality threshold indicates that the UE should decrease the number of antenna elements used for beamformed wireless communication between the transmitting device and the UE; and wherein adjusting the number of antenna elements comprises:

prioritizing the comparison that indicates that the UE should increase the number of antenna elements over the comparison that indicates that the UE should decrease the number of antenna elements; and increasing the number of antenna elements, relative to the first set of one or more antenna elements, for receiving the second signal.

7. The method of claim 1, wherein the channel quality metric is a received power measurement associated with a reference signal transmitted from a base station to the UE, a signal-to-noise ratio measurement associated with a reference signal transmitted from a base station to the UE, or a spectral efficiency measurement associated with a reference signal transmitted from a base station to the UE.

8. The method of claim 1, wherein the first set of one or more antenna elements represents a maximum number of available antenna elements associated with the first beam for beamformed wireless communication between the transmitting device and the UE;

wherein the second set of one or more antenna elements is a subset of the first set of one or more antenna elements and has fewer antenna elements than the first set of one or more antenna elements; and the method further comprising:

determining that the first beam remains valid for beamformed wireless communication between the transmitting device and the UE; and selecting the second set of one or more antenna elements instead of the first set of one or more antenna elements for receiving the second signal based on the comparison of the channel quality metric with the channel quality threshold.

9. The method of claim 1, wherein the channel quality metric is determined for the first beam, and the first beam has a higher beamforming gain than the second beam, wherein receiving the second signal comprises selecting the second beam to receive the second signal instead of the first beam, despite the first beam having the higher beamforming gain, based on a determination that the channel quality metric determined for the first beam exceeds the channel quality threshold.

10. The method of claim 1, wherein the first signal and the second signal are beamformed millimeter wave (mmW) signals transmitted from a base station to the UE.

11. The method of claim 1, further comprising:

receiving the first signal and second signal by at least one antenna element of the UE;

processing the first signal and second signal by at least one radio frequency front end (RFFE) component of the UE;

processing the first signal and second signal by at least one transceiver component of the UE; and processing the first signal and second signal by at least one modem of the UE.

12. The method of claim 1, wherein the the signal used for determining the channel quality metric comprises a synchronization signal block (SSB).

13. A method of wireless communication, comprising:

receiving a first signal at a user equipment (UE) from a transmitting device using a first beam for beamformed wireless communication between the transmitting device and the UE, wherein the first beam uses a first set of one or more antenna elements of the UE;

determining a channel quality metric associated with a channel between the UE and the transmitting device;

selecting a channel quality threshold from a plurality of different thresholds based on one or more of a characteristic of the first beam, a characteristic of a radio frequency component of the UE, or a type of reference signal used for channel quality measurement;

comparing the channel quality metric with the channel quality threshold;

adjusting a number of antenna elements used for beamformed wireless communication between the transmitting device and the UE based on the comparison between the channel quality metric and the channel quality threshold; and receiving a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements.

14. The method of claim 13, wherein determining the channel quality metric comprises:

receiving a reference signal on the first beam transmitted from a base station to the UE, wherein the reference signal is a synchronization signal block (SSB), a channel state information reference signal (CSI-RS), or a demodulation reference signal (DMRS); and measuring one or more of a received power, a signal-to-noise ratio, or a spectral efficiency associated with the reference signal.

15. A method of wireless communication, comprising:

receiving a first signal at a user equipment (UE) from a transmitting device using a first beam for beamformed wireless communication between the transmitting device and the UE, wherein the first beam uses a first set of one or more antenna elements of the UE;

determining a channel quality metric associated with a channel between the UE and the transmitting device;

comparing the channel quality metric with a first channel quality threshold;

comparing the channel quality metric with a second channel quality threshold that is lower than the first channel quality threshold;

adjusting a number of antenna elements used for beamformed wireless communication between the transmitting device and the UE based on the comparison between the channel quality metric and the first channel quality threshold or the second channel quality threshold; and receiving a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements;

wherein adjusting the number of antenna elements comprises determining, for reception of the second signal, whether to decrease the number of antenna elements used for beamformed wireless communication between the transmitting device and the UE in response to a determination that the channel quality metric is above the first channel quality threshold, or to increase the number of antenna elements used for beamformed wireless communication between the transmitting device and the UE in response to a determination that the channel quality metric is below the second channel quality threshold;

wherein adjusting the number of antenna elements further comprises:

decreasing the number of antenna elements for reception of the second signal by one or more antenna element relative to a number of antenna elements in the first set of one or more antenna elements in response to the determination that the channel quality metric is above the first channel quality threshold; or increasing the number of antenna elements for reception of the second signal by one or more antenna element relative to the number of antenna elements in the first set of one or more antenna elements in response to the determination that the channel quality metric is below the second channel quality threshold.

16. A method of wireless communication, comprising:

receiving a first signal at a user equipment (UE) from a transmitting device using a first beam for beamformed wireless communication between the transmitting device and the UE, wherein the first beam uses a first set of one or more antenna elements of the UE;

determining a channel quality metric associated with a channel between the UE and the transmitting device;

comparing the channel quality metric with a first channel quality threshold;

comparing the channel quality metric with a second channel quality threshold that is higher than the first channel quality threshold;

adjusting a number of antenna elements used for beamformed wireless communication between the transmitting device and the UE based on the comparison between the channel quality metric and the first channel quality threshold or the second channel quality threshold; and receiving a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements;

wherein adjusting the number of antenna elements further comprises:

determining, for reception of the second signal, whether to decrease the number of antenna elements used for beamformed wireless communication between the transmitting device and the UE by a first number of one or more antenna elements in response to a determination that the channel quality metric is above the second channel quality threshold, or to decrease the number of antenna elements used for beamformed wireless communication between the transmitting device and the UE by a second number of antenna elements that is less than the first number in response to a determination that the channel quality metric is above the first channel quality threshold and below the second channel quality threshold.

17. An apparatus for wireless communication, comprising:

a processor; and a memory coupled with the processor, wherein the memory includes instructions executable by the processor to cause the apparatus to:

receive a first signal at a user equipment (UE) from a transmitting device using a first beam for beamformed wireless communication between the transmitting device and the UE, wherein the first beam uses a first set of one or more antenna elements of the UE;

determine a channel quality metric associated with a channel between the UE and the transmitting device based on a measurement of a signal received from the transmitting device;

identify a type of the signal used to determine the channel quality metric;

select a channel quality threshold from a plurality of different thresholds based on the identification of the type of the signal used to determine the channel quality metric;

compare the channel quality metric with the channel quality threshold;

adjust a number of antenna elements used for beamformed wireless communication between the transmitting device and the UE based on the comparison between the channel quality metric and the channel quality threshold; and receive a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements based on the adjustment of the number of antenna elements used for beamformed wireless communication between the transmitting device and the UE.

18. The apparatus of claim 17, wherein the channel quality metric is determined for the first beam, and the channel quality metric determined for the first beam is higher than a channel quality metric associated with the second beam, wherein the instructions executable by the processor to cause the apparatus to receive the second signal comprise:

instructions executable by the processor to cause the apparatus to select the second beam to receive the second signal instead of the first beam, despite the channel quality metric of the first beam being higher than the channel quality metric of the second beam, based on a determination that the channel quality metric determined for the first beam exceeds the channel quality threshold.

19. The apparatus of claim 17, wherein the channel quality threshold is fixed at the UE and does not change over time for all threshold comparisons by the UE that are associated with the first beam and a type of reference signal used for determining the channel quality metric; and wherein the instructions executable by the processor to cause the apparatus to compare the channel quality metric with the channel quality threshold comprise instructions executable by the processor to cause the apparatus to retrieve the channel quality threshold from a lookup table based on at least one of an identification of the first beam or an identification of the type of reference signal used for determining the channel quality metric.

20. The apparatus of claim 17, wherein the instructions executable by the processor to cause the apparatus to adjust the number of antenna elements comprise instructions executable by the processor to cause the apparatus to:

determine that the channel quality metric is above the channel quality threshold; and
reduce, based on the determination that the channel quality metric is above the channel quality threshold, the number of antenna elements used for beamformed wireless communication between the transmitting device and the UE from the first set of one or more antenna elements to the second set of one or more antenna elements that has fewer antenna elements than the first set of one or more antenna elements.

21. The apparatus of claim 17, wherein the instructions executable by the processor to cause the apparatus to adjust the number of antenna elements comprise instructions executable by the processor to cause the apparatus to:
determine that the channel quality metric is below the channel quality threshold; and
increase the number of antenna elements used for beamformed wireless communication between the transmitting device and the UE from the first set of one or more antenna elements to the second set of one or more antenna elements that has more antenna elements than the first set of one or more antenna elements.

22. The apparatus of claim 17, wherein the channel quality metric is a first channel quality metric and the channel quality threshold is a first channel quality threshold, wherein the instructions are further executable by the processor to cause the apparatus to:
determine a second channel quality metric associated with the channel between the UE and the transmitting device, wherein the second channel quality metric is a different type of quality metric than the first channel quality metric; and
compare the second channel quality metric with a second channel quality threshold that is different than the first channel quality threshold;
wherein the comparison of the first channel quality metric with the first channel quality threshold indicates that the UE should increase the number of antenna elements used for beamformed wireless communication between the transmitting device and the UE;
wherein the comparison of the second channel quality metric with the second channel quality threshold indicates that the UE should decrease the number of antenna elements used for beamformed wireless communication between the transmitting device and the UE; and
wherein the instructions executable by the processor to cause the apparatus to adjust the number of antenna elements comprise instructions executable by the processor to cause the apparatus to:
prioritize the comparison that indicates that the UE should increase the number of antenna elements over the comparison that indicates that the UE should decrease the number of antenna elements; and
increase the number of antenna elements, relative to the first set of one or more antenna elements, for receiving the second signal.

23. The apparatus of claim 17, wherein the channel quality metric is a received power measurement associated with a reference signal transmitted from a base station to the UE, a signal-to-noise ratio measurement associated with a reference signal transmitted from a base station to the UE, or a spectral efficiency measurement associated with a reference signal transmitted from a base station to the UE.

24. The apparatus of claim 17, wherein the first set of one or more antenna elements represents a maximum number of available antenna elements associated with the first beam for beamformed wireless communication between the transmitting device and the UE;
wherein the second set of one or more antenna elements is a subset of the first set of one or more antenna elements and has fewer antenna elements than the first set of one or more antenna elements; and
wherein the instructions are further executable by the processor to cause the apparatus to:
determine that the first beam remains valid for beamformed wireless communication between the transmitting device and the UE; and
select the second set of one or more antenna elements instead of the first set of one or more antenna elements for receiving the second signal based on the comparison of the channel quality metric with the channel quality threshold.

25. The apparatus of claim 17, wherein the channel quality metric is determined for the first beam, and the first beam has a higher beamforming gain than the second beam, wherein the instructions executable by the processor to cause the apparatus to receive the second signal comprise instructions executable by the processor to cause the apparatus to select the second beam to receive the second signal instead of the first beam, despite the first beam having the higher beamforming gain, based on a determination that the channel quality metric determined for the first beam exceeds the channel quality threshold.

26. The apparatus of claim 17, further comprising:
at least one antenna element configured to receive the first signal and second signal;
at least one radio frequency front end (RFFE) component configured to process the first signal and second signal;
at least one transceiver component configured to process the first signal and second signal; and
at least one modem configured to process the first signal and second signal.

27. An apparatus for wireless communication, comprising:
a processor; and
a memory coupled with the processor, wherein the memory includes instructions executable by the processor to cause the apparatus to:
receive a first signal at a user equipment (UE) from a transmitting device using a first beam for beamformed wireless communication between the transmitting device and the UE, wherein the first beam uses a first set of one or more antenna elements of the UE;
determine a channel quality metric associated with a channel between the UE and the transmitting device;
select a channel quality threshold from a plurality of different thresholds based on one or more of a characteristic of the first beam, a characteristic of a radio frequency component of the UE, or a type of reference signal used for channel quality measurement;
compare the channel quality metric with the channel quality threshold;
adjust a number of antenna elements used for beamformed wireless communication between the transmitting device and the UE based on the comparison between the channel quality metric and the channel quality threshold; and
receive a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements.

28. The apparatus of claim 27, wherein the instructions executable by the processor to cause the apparatus to determine the channel quality metric comprise instructions executable by the processor to cause the apparatus to:
receive a reference signal on the first beam transmitted from a base station to the UE, wherein the reference signal is a synchronization signal block (SSB), a channel state information reference signal (CSI-RS), or a demodulation reference signal (DMRS); and
measure one or more of a received power, a signal-to-noise ratio, or a spectral efficiency associated with the reference signal.

29. An apparatus for wireless communication, comprising:
a processor; and
a memory coupled with the processor, wherein the memory includes instructions executable by the processor to cause the apparatus to:
receive a first signal at a user equipment (UE) from a transmitting device using a first beam for beamformed wireless communication between the transmitting device and the UE, wherein the first beam uses a first set of one or more antenna elements of the UE;
determine a channel quality metric associated with a channel between the UE and the transmitting device;
compare the channel quality metric with a first channel quality threshold;
compare the channel quality metric with a second channel quality threshold that is lower than the first channel quality threshold;
adjust a number of antenna elements used for beamformed wireless communication between the transmitting device and the UE based on the comparison between the channel quality metric and the first channel quality threshold or the second channel quality threshold; and
receive a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements;
wherein the instructions executable by the processor to cause the apparatus to adjust the number of antenna elements are executable by the processor to cause the apparatus to determine, for reception of the second signal, whether to decrease the number of antenna elements used for beamformed wireless communication between the transmitting device and the UE in response to a determination that the channel quality metric is above the first channel quality threshold, or to increase the number of antenna elements used for beamformed wireless communication between the transmitting device and the UE in response to a determination that the channel quality metric is below the second channel quality threshold;
wherein the instructions executable by the processor to cause the apparatus to adjust the number of antenna elements are further executable by the processor to cause the apparatus to:
decrease the number of antenna elements for reception of the second signal by one or more antenna element relative to a number of antenna elements in the first set of one or more antenna elements in response to a determination that the channel quality metric is above the first channel quality threshold; or
increase the number of antenna elements for reception of the second signal by one or more antenna element relative to the number of antenna elements in the first set of one or more antenna elements in response to a determination that the channel quality metric is below the second channel quality threshold.

30. An apparatus for wireless communication, comprising:
a processor; and
a memory coupled with the processor, wherein the memory includes instructions executable by the processor to cause the apparatus to:
receive a first signal at a user equipment (UE) from a transmitting device using a first beam for beamformed wireless communication between the transmitting device and the UE, wherein the first beam uses a first set of one or more antenna elements of the UE;
determine a channel quality metric associated with a channel between the UE and the transmitting device;
compare the channel quality metric with a first channel quality threshold;
compare the channel quality metric with a second channel quality threshold that is higher than the first channel quality threshold;
adjust a number of antenna elements used for beamformed wireless communication between the transmitting device and the UE based on the comparison between the channel quality metric and the first channel quality threshold or the second channel quality threshold; and
receive a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements;
wherein the instructions executable by the processor to cause the apparatus to adjust the number of antenna elements are further executable by the processor to cause the apparatus to:
determine, for reception of the second signal, whether to decrease the number of antenna elements used for beamformed wireless communication between the transmitting device and the UE by a first number of one or more antenna elements in response to a determination that the channel quality metric is above the second channel quality threshold, or to decrease the number of antenna elements used for beamformed wireless communication between the transmitting device and the UE by a second number of antenna elements that is less than the first number in response to a determination that the channel quality metric is above the first channel quality threshold and below the second channel quality threshold.

31. An apparatus for wireless communication, comprising:
means for receiving a first signal at a user equipment (UE) from a transmitting device using a first beam for beamformed wireless communication between the transmitting device and the UE, wherein the first beam uses a first set of one or more antenna elements of the UE;

means for determining a channel quality metric associated with a channel between the UE and the transmitting device based on a measurement of a signal received from the transmitting device;

means for identifying a type of the signal used for determining the channel quality metric;

means for selecting a channel quality threshold from a plurality of different thresholds based on the identification of the type of the signal used for determining the channel quality metric;

means for comparing the channel quality metric with the channel quality threshold;

means for adjusting a number of antenna elements used for beamformed wireless communication between the transmitting device and the UE based on the comparison between the channel quality metric and the channel quality threshold; and means for receiving a second signal at the UE from the transmitting device using a second beam for beamformed wireless communication between the transmitting device and the UE, wherein the second beam uses a second set of one or more antenna elements of the UE that has a different number of antenna elements than the first set of one or more antenna elements based on the adjustment of the number of antenna elements used for beamformed wireless communication between the transmitting device and the UE.

* * * * *